350-357 SR

9/4/84 XR 4,469,449

United States Patent [19]

Kato

[11] Patent Number: 4,469,449

[45] Date of Patent: Sep. 4, 1984

[54] DRIVE SYSTEM FOR ELECTROCHROMIC DISPLAY CELL

[75] Inventor: Toshikiyo Kato, Tanashi, Japan

[73] Assignee: Citizen Watch Company Limited, Tokyo, Japan

[21] Appl. No.: 448,680

[22] Filed: Dec. 10, 1982

[30] Foreign Application Priority Data

Dec. 11, 1981 [JP] Japan ................................ 56-198485

[51] Int. Cl.[3] ........................ G04C 17/00; C09F 9/00; G02F 1/17

[52] U.S. Cl. .................................... 368/239; 340/785; 350/357

[58] Field of Search .................... 368/82, 84, 239, 242; 340/785, 803–805; 350/357

[56] References Cited

U.S. PATENT DOCUMENTS

Re. 28,199 10/1974 Deb et al. ............................ 340/785
3,950,936 4/1976 Oguey et al. ......................... 340/785
3,987,433 10/1976 Kennedy ............................. 368/239
4,034,550 7/1977 Kouchi et al. ....................... 350/357
4,057,739 11/1977 Otake ................................. 340/785
4,077,032 2/1978 Volkman ............................. 368/239
4,205,903 6/1980 Inami et al. ......................... 340/785

*Primary Examiner*—Vit W. Miska
*Attorney, Agent, or Firm*—Jordan and Hamburg

[57] ABSTRACT

A system for driving elements of an ECD cell, whereby each of at least two different color density states can be selectively designated for each element so that two different functions can be indicated by a single element. The selective designation is accomplished by comparing a command signal indicating the required current display state of an element with the contents of a memory circuit which stores the previous display state, the memory being capable of storing data representing at least two different display states. Any required change in the display state is thereby detected, and a predetermined amount of charge is accordingly supplied to or taken from the display element such as to produce the desired change in density state.

10 Claims, 14 Drawing Figures

51o
51a
51b
51c
51d
51e
51f
51g
TN
TP
10
10A
10B
10C
10D
10E
10F
10G
Iw
Ie
Pa1
Pb1
Pa2
Pb2
Pa7
Pb7
9A
9B
9C
9D
9E
9F
9G
9a
9b
9c
9d
9e
9f
9
Wl1
Wl2
Cwb1
Cwa1
Cea1
Ceb1
8A
8B
8C
8D
8E
8F
8G
8a
8b
8c
8d
8e
8f
8g
8h
8

DRIVE SYSTEM FOR ELECTROCHROMIC DISPLAY CELL

BACKGROUND OF THE INVENTION

The present invention relates to a system for driving elements of an electrochromic (hereinafter abbreviated to ECD) display cell, and more specifically, to a system for driving elements of an ECD cell whereby a single cell element can attain a plurality of stable coloration density states, so that such an element can perform a plurality of functions.

At the present time, liquid crystal display cells are widely utilized in various types of electrical equipment, and particularly in portable electronic devices such as electronic timepieces. With such a liquid crystal display, each display element can attain only two display states, e.g. clear state and a dark state. It is a characteristic of liquid crystal display cells in general that the degree of cell contrast varies in dependence on the angle from which the cell face is viewed. Thus, even if it were possible to produce a liquid crystal display cell having three or more display states, such a device would not be practical, due to the changes in display contrast which result from changes in the viewing angle. With an ECD cell, however, the degree of display contrast does not vary with the viewing angle. In addition, it is possible to establish a plurality of display density states for the elements of an ECD cell, e.g. a colorless state, a dark or densely colored state, and one or more states of intermediate color density. Various proposals have been put forward in the prior art whereby these properties of ECD cells are used to provide displays in which a display segment performs two different functions by attaining two different coloration density states. However such proposals have been vague and nonspecific, and no practical system for implementing an ECD cell drive system has been disclosed which would not be extremely complex and which would meet the most important requirements for such a system. These requirement will be briefly described, referring to Table 1 below.

TABLE 1

| COMBINATIONS OF SEGMENT DISPLAY STATE CHANGES | | | |
|---|---|---|---|
| 1 | clear - clear | 6 | grey - dark |
| 2 | clear - grey | 7 | dark - clear |
| 3 | clear - dark | 8 | dark - grey |
| 4 | dark - clear | 9 | dark - dark |
| 5 | grey - grey | | |

Entries 1 to 8 in Table 1 denote each of the various combinations of changes in display state which can occur for a segment of a CMOS cell. Thus for example, entry 2 denotes the change from the clear display state to the grey display state. Entry 8 again indicates a change by which the grey state is attained, but in this case a transition is made from the dark state into the grey state. It is an essential requirement for a satisfactory drive system to provide such a plurality of display states that the color density of the grey display state resulting from a change from the dark level must be identical to the density of a grey state which results from a change from the clear state. Similarly, it must be ensured that the density of a dark display state which results from a transition from the grey state is identical to the density of the dark state which results from a change from the clear state. Unless these requirements are met, it will not be possible to provide a satisfactory ECD display device in which display segments can attain a plurality of coloration density states. No system has been disclosed in the prior art which will meet these requirements and which is at the same time sufficiently free from complexity to be suitable for practical realization. However such a system is disclosed by the present invention, as will be made clear in the specification.

It will be noted that for certain entries in Table 1 above, no actual change in segment display density occur, e.g. as in the case of entries 1, 5 and 9. These correspond to a condition in which, when a periodically performed check is carried out to determine whether a change in display state has been designated, it is found that no change is required, and the segment is therefore left in the same display state. This can be generally achieved, with an ECD cell, by leaving the segment in an open-circuit condition so that no charge is discharged therefrom.

SUMMARY OF THE INVENTION

A drive system for an ECD cell according to the present invention basically comprises a timing signal generating circuit, a display data circuit, a converter circuit, a memory circuit, a density change detection circuit, a selector circuit, a power source, and a drive circuit. The timing signal generating circuit produces various timing signals to control the overall operation of the system. The display data circuit serves to produce signals which correspond to the data to be displayed, and can for example comprise the timekeeping counter circuit section of an electronic timepiece. The converter circuit converts the signals from the display data circuit into signals which designate into which of the display states a display segment is to be set, in order to visually represent the data to be displayed. In the following, it will be assumed that the ECD cell segments can be set into three different coloration density states, one of which is an essentially colorless state referred to herein as the clear state. The other states are a state of maximum density, referred to as the dark state, and a coloration density state which is intermediate between the clear and the dark states, and which will be referred to as the grey state. It should be noted that the term "grey" is used purely for brevity of description, since the actual color may be, for example, pale blue. Thus, the output signals from the converter circuit designate, for each display segment, whether the segment is to be set in the clear state, the grey state, or the dark state. The output signals from the converter circuit, referred to as the display data command signals, are applied to a density change detection circuit and to a memory circuit, with the latter periodically acting to memorize the display data command signals in response to signals from the timing signal generating circuit. These memorized signasl are compared with the display data command signals from the converter circuit, by the density change detection circuit. When any change occurs in the output signals from the converter circuit, then since the contents of the memory circuit represent the preceding display state of each segment, any required change in display density state is detected by the density change detection circuit, which produces output signals accordingly. In response to these output signals, the selector circuit acts to transfer the appropriate timing pulses from the timing signal generating circuit to logic gates in the drive circuit, and in response to these pulses, the drive circuit supplies power from the power source to the ECD cell segments whose density state has to be changed. More specifically, the drive circuit acts to increase the amount of charge stored by a segment whose density state is to be increased, and to reduce the charge stored by a segment whose density state is to be decreased. These changes in cell segment charge amount are precisely controlled by the durations of specific timing signal pulses produced by the timing signal generating circuit. The power source supplies either accurately stablized voltages from a voltage stabilizer circuit, or accurately controlled currents from a current stabilizer circuit. In this way, the amount of charge stored by each cell segment, and hence the degree of coloration of each segment, can be precisely controlled.

It is a particular feature of the present invention that the memory circuit is capable of storing aa plurality of density states for each segment, e.g. as in the described embodiments three display states for each segment, namely the clear, grey and dark states referred to above. Such an arrangement enables a simple and extremely practical circuit configuration to be implemented for the ECD cell drive system, as will be made clear from the description given hereinafter of the preferred embodiments.

DESCRIPTION OF THE PREFERRED EMBODIMENTS

Figure 1:
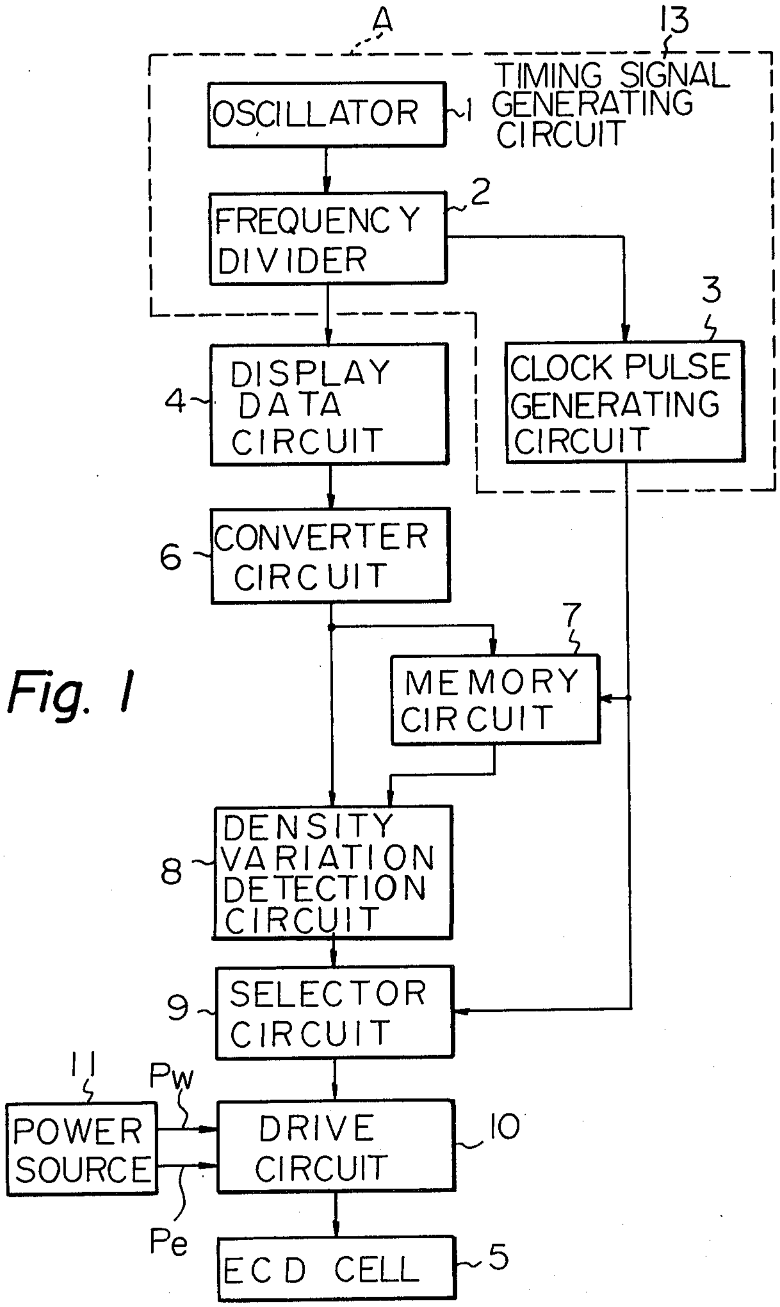
FIG. 1 is a general block circuit diagram for describing the basic principles of a drive system for an ECD cell according to the present invention.

FIG. 1 is a block circuit diagram of an ECD cell cell drive system for illustrating the basic operations of the present invention. Reference numeral 1 denotes an oscillator circuit, numeral 2 denotes a frequency divider circuit which receives the output signal from oscillator circuit 1 as an input signal, and produces a frequency divided signal. Numeral 3 denotes a clock pulse generating circuit which receives the frequency divided signals from frequency divider circuit and produces clock pulses. The above circuit blocks 1 to 3 constitute a timing signal generating circuit 13. Numeral 4 denotes a display data circuit which performs timekeeping operations in accordance with the frequency divided signals from frequency divider circuit 2 and comprises a timekeeping circuit. Numeral 5 denotes an ECD cell, and numeral 6 denotes a converter circuit which converts the timekeeping contents of timekeeping circuit into display data command signals which determine the display states of ECD cell 5. Numeral 7 denotes a memory circuit, which memorizes the contents of converter circuit in synchronism with clock pulses from clock pulse generating circuit 3. Numeral 8 denotes a density variation detection circuit, which receives as input signal the memorized signals from memory circuit 7 and the display data command signals from converter circuit 6. Numeral 9 denotes a selector circuit, and numeral 10 denotes a drive circuit which selectively supplies either write-in power Pw or erase power Pe to ECD cell cell from power source 11, in accordance with the output signals from selector circuit 9.

The power source 11 comprises a battery (not shown in the drawings) and a voltage stabilizer circuit or current stabilizer circuit, (also not shown in the drawings). The elements described above operate from the battery of power source 11 as a source of electrical operating power.

Figures 2, 2A, 2B, 2C, 2D:
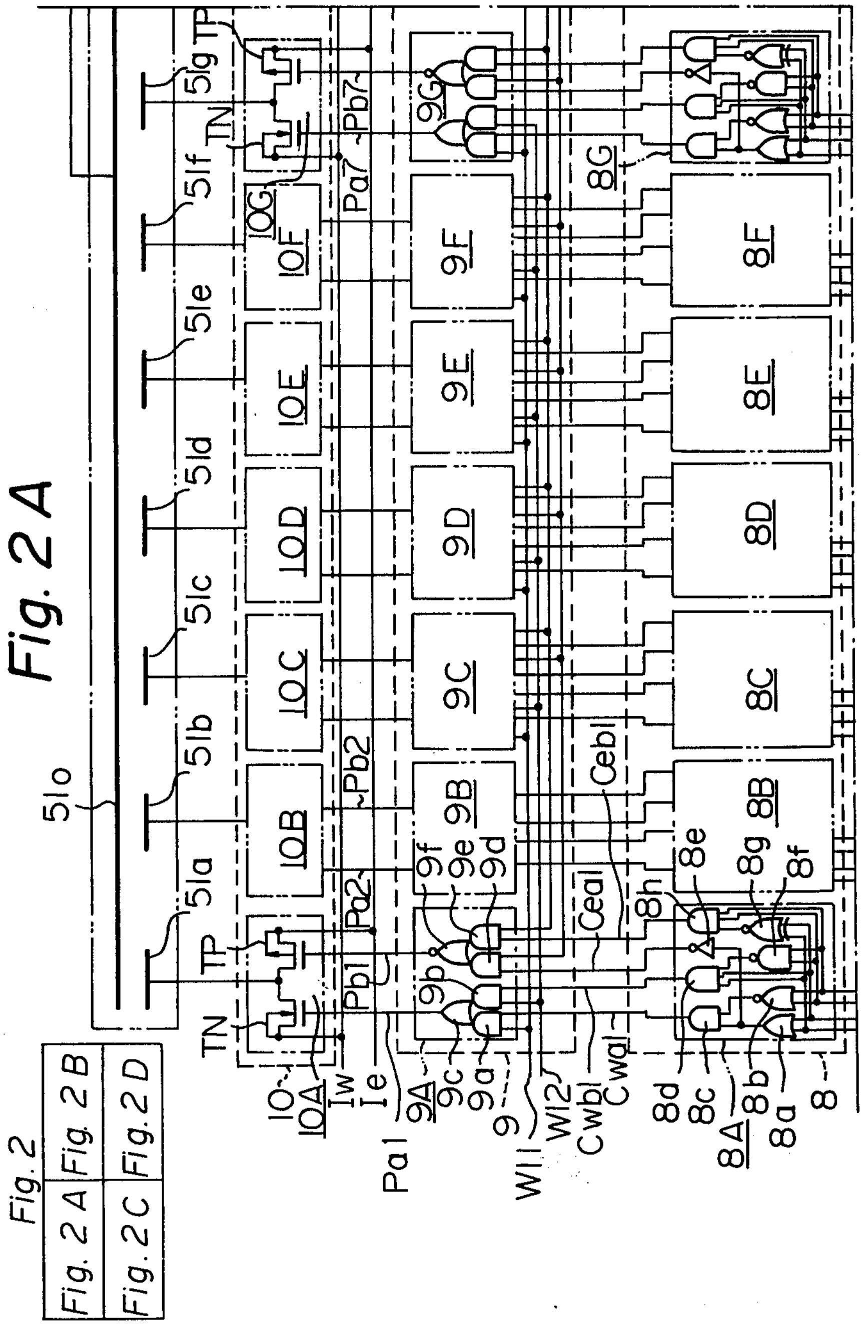
FIGS. 2A–2D are partial circuit diagrams of a first embodiment of a drive system for an ECD cell according to the present invention.
Figure 2B:
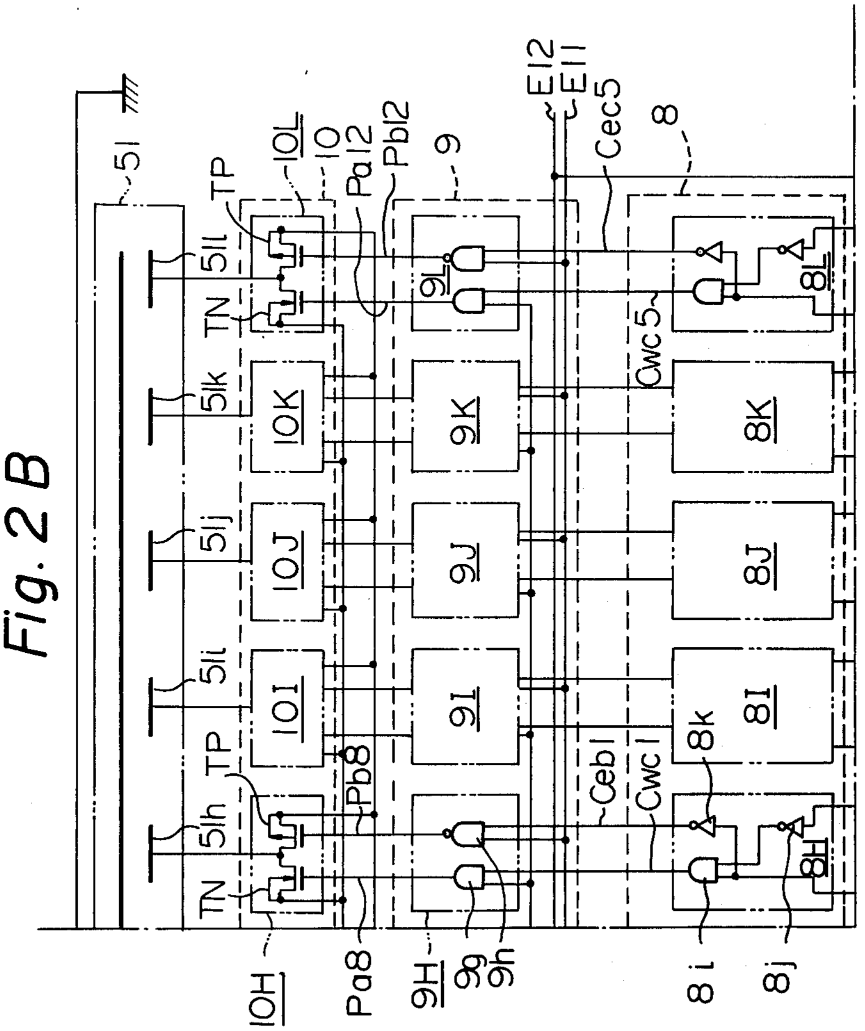
Figure 2C:
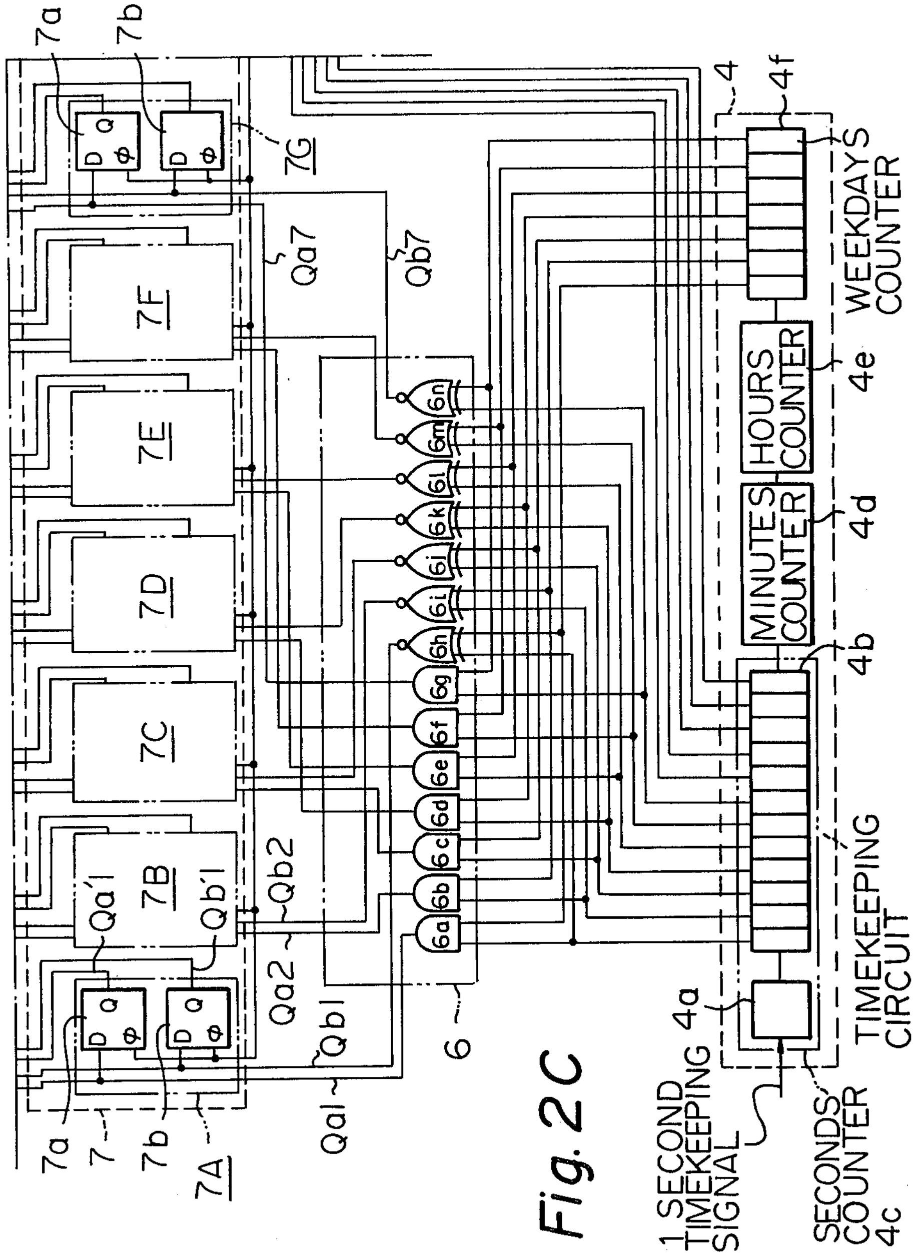
Figure 2D:
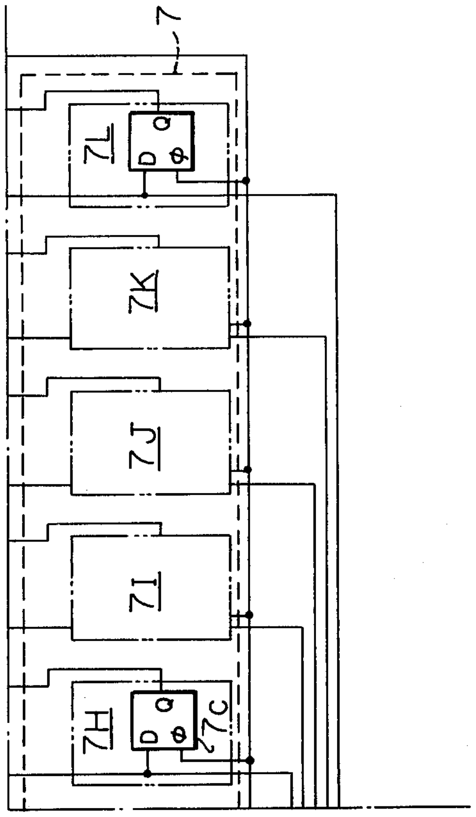
Figure 3:
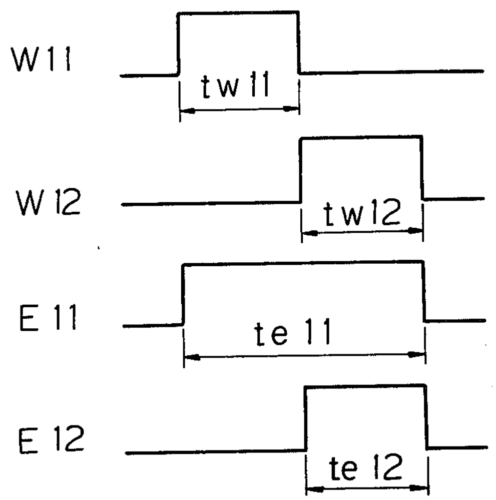
FIG. 3 is a timing chart for assistance in describing the operation of the first embodiment of FIGS. 2A and 2B.
Figure 4:
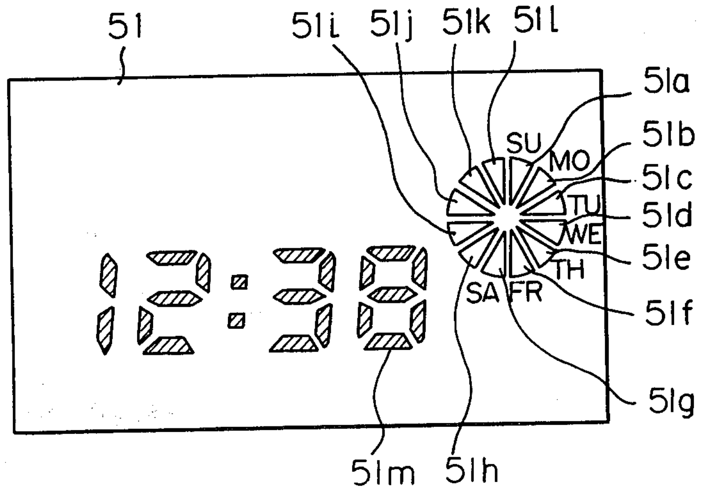
FIG. 4 is a plan view of an ECD cell used in the first embodiment.

FIGS. 2A and 2B together constitute a circuit diagram showing the essential portions of a first embodiment of the present invention, and are divided for convenience. FIG. 3 is a timing chart for assistance in describing the operation of the circuit portions shown in FIG. 2A. FIG. 4 is a plan view of an ECD cell 51 used in the first embodiment. In addition to a plurality of segments 51*m* which are used to indicate the hours and minutes of current time, 51 is provided with a set of 12 radial segments 51*a* to 51*l* arranged in a circle. The seconds of current time are indicated in units of 5 seconds by the latter set of segments. In other words, when zero seconds time is reached, the segment 51*a* flashes on and off for five seconds, then segment 51*b* flashes on and off for five seconds, and so on successively with segments 51*c* to 51*k*. In this embodiment, the flashing is accomplished by switching between the clear display state and the grey display state. In addition, the first two letters of each of the days of the week, i.e. SU, MO, TU, WE, TH, FR and SA are sequentially indicated by each of the segments 51*a* to 51g performing flashing between the clear and the grey display states. When indication of the seconds of time, in five seconds units, and the indication of the weekday is being performed by the same segment, i.e. when overlap occurs between the seconds and the weekdays indication, then it is arranged that the segment in question is set into the dark display state. In the circuits of FIGS. 2A and 2B, the segments indicated as 51*a* to 51*l* correspond to the segments having the same designation shown in FIG. 4. The circuits required to drive the hours and minutes time indicating segments 51*m* are omitted from the drawings, since such circuits, for providing only two display states of ECD cell segments (i.e. a clear state and a dark state, or a clear state and a grey state) are well known in the art.

In the first embodiment of FIGS. 2A and 2B, the power source 11 uses a stabilized current source which produces a stabilized write current Iw and a stabilized erase current Ie, to thereby drive ECD cell 51. In FIGS. 2A and 2B, numeral 4 denotes a display data circuit which comprises a timekeeping circuit made up of a seconds counter circuit 4*c* comprising a 1/5 frequency divider circuit 4*a* which receives as input the 1 second period signal from frequency divider circuit 2 and a shift register 4*b* having 12 stages, which is connected in connected in cascade with 1/5 frequency divider circuit 4*a*. The display data circuit 4 further comprises a minutes timekeeping counter 4*d* which receives as input a 1-minute period signal from the seconds counter circuit 4*c*, and also an hours counter 4*e* which receives a 1-hour period signal from minutes timekeeping counter 4*d*, and moreover comprises a weekdays counter circuit 4*f* which comprises a 7-stage shift register that receives as input a 1-day period signal from hours counter circuit 4*e*. The shift register 4*b* in seconds counter circuit 4*c* sequentially produces the seconds timekeeping signals S*a* and S*l* in response to a 5-second period signal which is input thereto from frequency divider circuit 4*a*.

TABLE 2

| Seconds value | Sa | Sb | Sc | Sd | Se | Sf | Sg | Sh | Si | Sj | Sk | Sl |
|---|---|---|---|---|---|---|---|---|---|---|---|---|
| 1 to 5 | 1 | Ø | Ø | Ø | Ø | Ø | Ø | Ø | Ø | Ø | Ø | Ø |
| 6 to 1Ø | Ø | 1 | Ø | Ø | Ø | Ø | Ø | Ø | Ø | Ø | Ø | Ø |
| 11 to 15 | Ø | Ø | 1 | Ø | Ø | Ø | Ø | Ø | Ø | Ø | Ø | Ø |
| 16 to 2Ø | Ø | Ø | Ø | 1 | Ø | Ø | Ø | Ø | Ø | Ø | Ø | Ø |
| 21 to 25 | Ø | Ø | Ø | Ø | 1 | Ø | Ø | Ø | Ø | Ø | Ø | Ø |
| 26 to 3Ø | Ø | Ø | Ø | Ø | Ø | 1 | Ø | Ø | Ø | Ø | Ø | Ø |
| 31 to 35 | Ø | Ø | Ø | Ø | Ø | Ø | 1 | Ø | Ø | Ø | Ø | Ø |
| 36 to 4Ø | Ø | Ø | Ø | Ø | Ø | Ø | Ø | 1 | Ø | Ø | Ø | Ø |
| 41 to 45 | Ø | Ø | Ø | Ø | Ø | Ø | Ø | Ø | 1 | Ø | Ø | Ø |
| 46 to 5Ø | Ø | Ø | Ø | Ø | Ø | Ø | Ø | Ø | Ø | 1 | Ø | Ø |
| 51 to 55 | Ø | Ø | Ø | Ø | Ø | Ø | Ø | Ø | Ø | Ø | 1 | Ø |
| 56 to Ø | Ø | Ø | Ø | Ø | Ø | Ø | Ø | Ø | Ø | Ø | Ø | 1 |

The weekdays counter circuit 4*f* sequentially produces the weekday signals Wa to Wg at the 1 logic level as shown in Table 3 below, in response to the 1-day period signal from hours counter circuit 4*e*.

TABLE 3

| | Weekdays timekeeping signals | | | | | | |
|---|---|---|---|---|---|---|---|
| Weekday value | Wa | Wb | Wc | Wd | We | Wf | Wg |
| Sunday | 1 | Ø | Ø | Ø | Ø | Ø | Ø |
| Monday | Ø | 1 | Ø | Ø | Ø | Ø | Ø |
| Tuesday | Ø | Ø | 1 | Ø | Ø | Ø | Ø |
| Wednesday | Ø | Ø | Ø | 1 | Ø | Ø | Ø |
| Thursday | Ø | Ø | Ø | Ø | 1 | Ø | Ø |
| Friday | Ø | Ø | Ø | Ø | Ø | 1 | Ø |
| Saturday | Ø | Ø | Ø | Ø | Ø | Ø | 1 |

Numeral 6 denotes a converter circuit which receives as input the seconds timekeeping signals Sa to Sg from seconds counter circuit 4*c* and the weekdays timekeeping signals Wa to Wg from weekdays counter circuit 4*f*, and which produces as output signals the display data command signals Qa1 to Qa7 and the display data command signals Qb1 to Qb2. The circuit comprises AND gates 6*a* to 6*g*, which constitute a first gate group, and exclusive-OR gate group 6*h* to 6*m* which constitute a second gate group. These gate circuits perform the following logical operations:

$$Qa1 = Sa \cdot Wa \qquad Qvb1 = Sa \cdot Wa + Sa \cdot Wa$$
$$Qa2 = Sb \cdot Wb, \qquad Qb2 = Sb \cdot Wb + Sb \cdot Wb$$
$$Qa7 = Sg \cdot Wg, \qquad Qb7 = Sg \cdot Wg + Sg \cdot Wg$$

If the display data command signals Qa1 to Qa7 are designated collectively as the display data command signals Qa and the display data command signals Qb1 to Qb7 are designated collectively as the display data command signals Qb, then the display density states of segments 51*a* to 51*g* of ECD cell 51 are designated by combinations of logic levels of the display data command signals Qa and Qb, as is shown in Table 4 below.

TABLE 4

| Display density command signals | | |
|---|---|---|
| Qa | Qb | Command contents |
| Ø | Ø | Clear display state |
| 1 | Ø | Grey display state |
| Ø | 1 | Grey display state |
| 1 | Ø | Dark display state |

The seconds timekeeping signals Sh to Sl from seconds counter circuit 4*c* are not input to the converter circuit 6 in this embodiment. Instead, those signals are handled as display data command signals, which designate the clear display state or the grey display state, i.e. two different display states. If a specific one of these signals Sh to Sl is assumed to be at the 1 logic level, then that specific signal will designate the grey display state. The other seconds timekeeping signals, except for that specific signal at the 1 logic level, (i.e. the signals at the 0 logic level) designate the clear display state.

Numeral 7 denotes a memory circuit. This comprises a group of memory circuit sections 7A to 7G, which each comprise a set of data type flip-flops such as the set 7*a* and 7*b* in msec 7A. These serve to memorize the display data command signals Qa and Qb, with the states of these signals being latched into the memory circuit sections on the falling edge of the pulse E12 (i.e. when E12 goes from the 1 to the 0 logic level), and thereby output a group of memory signals Qa1′ to Qa7′ (which will be collectively designated as Qa′) and a group of memory signals Qb1′ to Qb7′ (collectively designated as memory signals b′). The memory circuit 7 further comprises a set of memory circuit sections 7H to 7L, each of which comprises a data-type flip-flop (dff) such as dff 7*c* of memory circuit section 7H. These memory circuit sections serve to memorize the timekeeping signals Sh to Sl from seconds timekeeping counter 4*c*, on the falling edge of pulse E12, and thereby produce as outputs the memory signals Sh′ to Sl′. The memory signals Qa′ from memory circuit sections 7A to 7G therefore represent the previous display states designated for display segments 51*a* to 51*g* to ECD cell 51. When a new E12 pulse is generated, then the currently designated display density states of segments 51*a* to 51*g* (i.e. the clear, grey or dark display states) are memorized on the falling edge of that E12 pulse. In addition, the memory circuit sections 7H to 7L serve to memorize the previously designated display states of ECD cell segments 51*h* to 51*l*. When a new E12 pulse is applied thereto, then the currently designated display states of segments 51*h* to 51*l* (i.e. the clear of the grey display states) are memorized on the falling edge of the E12 pulse. Numeral 8 denotes a density variation detection circuit. This circuit comprises a set of display density variation detection circuit sections 8A to 8G, and 8H to 8L. The density change detection circuit sections 8A to 8G receive as inputs the display data command signals Qa and Qb from converter circuit 6, and the display memory signals Qa′ and b′ from memory circuit sections 7A to 7G, and produce as output signals a group of signals which are based on the logic equations shown hereinafter, a set of control signals Cwa1 to Cwa7, collectively designated as control signals Cwa, a set of control signals Cwb1 to Cwb7 collectively designated as Cwb, a set of control signals Cea1 to Cea7, collectively designated as Cea, and a set of control signals Ceb1 to Ceb7, collectively designated as Ceb.

The density change detection circuit sections 8H to 8L receive as input signals the seconds timekeeping signals Sh to Sl from seconds timekeeping counter 4C and memory signals Sh' to Sl' from memory circuit sections 7H to 7L, and produce therefrom output signals based on the logic equations (5) and (6) shown below, also a group of control signals Cwc1 to Cwc5 (collectively designated as Cwc), and a group of signals Cec1 to Cec7 (collectively designated as Cec). The density change detection circuit 8 serves to detect changes in the designated density display states of ECD cell segments 51*a* to 51*l*, i.e. changes from previously designated display states, and produces control signals Cwa, Cwb, cea, ceb, cwc and cec, setting appropriate ones of these signals at the 1 logic level in accordance with the detection results. This is illustrated in Table 5 below. The density change detection circuit sections 8A to 8G each comprise the set of elements shown for section 8A, i.e. or OR gate 8*a*, NOR gate 8*b*, AND gates 8*c*, 8*d* and 8*h*, inverter 8*e*, NAND gate 8*f*, and exclusive-OR gate 8*g*. In addition, the density change detection circuit sections 8H to 8L each comprise a set elements as shown for section 8H, i.e. an AND gate 8*i* and inverter 8*j* and 8*k*.

Numeral 9 denotes a selector circuit comprising selector circuit sections 9A to 9G, and selector circuit sections 9H to 9L. The selector circuit sections 9A to 9G receive as inputs the control signals Cwa, Cwb, Cea and Ceb from density change detection circuit sections 8A to 8G, and clock pulse signals from clock pulse generating circuit 3 shown in FIG. 1, i.e. the first write timing pulse W11, the second write timing pulse W12, first erase timing pulse E11, and second erase timing pulse E12, and produces as outputs signals Pa1 to Pa7 and signals Pb1 to Pb7. Selection circuit sections 9H to 9L receives as input signals the control signals Cwb and Cec from density change detection circuit sections 8H to 8L, and select clock pulse signals from clock pulse generating circuit 3 shown in FIG. 1, i.e. select the first write timing pulse W11, the first erase timing pue E11, and produces as outputs the signals Pa8 to Pa12, Pb8 to Pb12. The selector circuit sections 9A to 9G each comprise the elements shown for sec 9B, i.e. AND gates 9*a*, 9*b*, 9*d* and 9*e*, OR gate 9*c* and NOR gate 9*f*. In addition, the selector circuit sections 9H to 9L each comprise the elements shown for sec 9H, i.e. AND gate 9*g* and NAND gate 9*h*.

Table 5 and equations (1) to (6) are shown below.

$$cwa=(Qa+Qb)\times Qa'\times b' \quad (1)$$

$$Cwb=Qa\times Qb\times(Qa'+b') \quad (2)$$

$$Cea=Qa\times Qb \quad (3)$$

$$ceb=(Qa\times Qb+Qa\times Qb)\times Qa'\times b' \quad (4)$$

$$Cwc=Sh\times Sh'=Si\times Si'=\ldots=Sl\times Sl' \quad (5)$$

$$Cec=Sh=Si=\ldots=Sl \quad (6).$$

TABLE 5

| Control signals | Previous display density state | Currently designated display density state |
|---|---|---|
| Cwa = 1 | clear | grey or dark |
| Cwb − 1 | clear or grey | dark |
| Cea = 1 | clear or dark or grey | clear |
| Ceb = 1 | dark | grey |
| Cwc = 1 | clear | grey |
| Cec = 1 | clear or grey | clear |

Numeral 10 denotes a drive circuit which comprises drive circuit sections 10A to 10L, and which receive as inputs the signals Pa1 to Pa12 and signals Pb1 to Pb12 from selector circuit circuit 9, and act to selectively supply to segments 51*a* to 51*l* of ECD cell 51 the stabilized write current Iw and stabilized write current Ie. The drive circuit sections 10A to 10L each comprise the elements shown for sec 10A, i.e. an N-channel MOS transistor Tn and a P-channel MOS transistor Tp.

The configuration shown in FIG. 3 is such that the following relationships exist between pulses W11, W12, E11 and E12, which are output from clock pulse generating circuit 3:

$$Iw=tw12=Ie\times te12$$

$$Ie\times(tw11+tw12)<Ie\times te11$$

Here, it is assumed that pulses W11 and W12 do not overlap in time. Iw is the stabilized write current, and Ie is the stabilized erase current. tw11 the time for which pulse W11 is at the 1 logic level, tw12 is the time for which pulse W12 is at the 1 logic level, te11 is the time for which pulse E11 is at the 1 logic level, te12 is the time for which pulse E12 is at the 1 logic level.

The operation of this embodiment will now be described, with reference to FIGS. 2A and 2B, and FIG. 3. The contents of timekeeping circuit 4 shown in FIG. 1 are updated by the 1-second period signal from frequency divider circuit 2 shown in FIG. 1. The contents of this timekeeping circuit, i.e. the weekdays timekeeping signals Wa to Wg, are transferred through converter circuit to be output as the command signals Qa and Qb which designate the display states of segments 51*a* to 51*g* of ECD cell 51. In addition, the command signals Qa and Qb are memorized by memory sections 7A to 7G, on the falling edge of pulse E12. The resultant memory signals are output as Qa' and Qb'. At the same time, the seconds timekeeping signals Sa to Sl from seconds counter circuit 4*c* are memorized by memory sections 7H to 7L, in synchronism with the falling edge of pulse E12, and the resultant memory signals are output as signals Sh' to Sl'.

Table 6 below illustrates the operation of density change detection circuit sections 8A to 8G, and of drive circuit sections 9A to 9G, and the drive operations performed upon segments 51A to 51G of ECD cell 51 in accompaniment with output signals from drive circuit sections 9A to 9G. Table 6 also illustrates the operation of density change detection circuit sections 8H to 8L, of drive circuit sections 9H to 9L, and the drive operations performed on ECD cell 51 segments 51*h* to 51*l* in accordance with output signals from drive circuit sections 9H to 9L.

TABLE 6

| DISPLAY STATE CHANGE | MEMORY CIRCUIT | | CONVERTER CIRCUIT | | DENSITY CHANGE DETECTION CIRCUIT | | | | DRIVE CONDITIONS | | |
|---|---|---|---|---|---|---|---|---|---|---|---|
| | Qa' | Qb' | Qa | Qb | Cwa | Cwb | Cea | Ceb | TN | TP | CHARGE AMOUNT |
| 1 CLEAR STATE TO CLEAR STATE | “0” | “0” | “0” | “0” | “0” | “0” | “1” | “0” | OFF | ON | Ie × $te_{11}$ |
| 2 CLEAR STATE TO GREY STATE | “0” | “0” | “0”<br>“1” | “1”<br>“0” | “1” | “0” | “0” | “0” | ON | OFF | Iw × $tw_{11}$ |
| 3 CLEAR STATE TO DARK STATE | “0” | “0” | “1” | “1” | “1” | “1” | “0” | “0” | ON | OFF | Iw × ($tw_{11}$ + $tw_{12}$) |
| 4 GREY STATE TO CLEAR STATE | “0”<br>“1” | “1”<br>“0” | “0” | “0” | “0” | “0” | “1” | “0” | OFF | ON | Ie × $te_{11}$ |
| 5 GREY STATE TO GREY STATE | “0”<br>“1” | “1”<br>“0” | “0”<br>“1” | “1”<br>“0” | “0” | “0” | “0” | “0” | OFF | OFF | OPEN-CIRCUIT STATE |
| 6 GREY STATE TO DARK STATE | “0”<br>“1” | “1”<br>“0” | “1” | “1” | “0” | “1” | “0” | “0” | ON | OFF | Iw × $tw_{12}$ |
| 7 DARK STATE TO CLEAR STATE | “1” | “1” | “0” | “0” | “0” | “0” | “1” | “0” | OFF | ON | Ie × $te_{11}$ |
| 8 DARK STATE TO GREY STATE | “1” | “1” | “0”<br>“1” | “1”<br>“0” | “0” | “0” | “0” | “1” | OFF | ON | Ie × $te_{12}$ |
| 9 DARK STATE TO DARK STATE | “1” | “1” | “1” | “1” | “0” | “0” | “0” | “0” | OFF | OFF | OPEN-CIRCUIT STATE |

Table 6 above is a summary of the contents of Table 3, Table 5, and the results of logic equations (1) to (4). The entries containing dotted lines in Table 6 indicate that either of the two logic levels is valid. The “open” condition shown in Table 6 is a condition in which both of transistors Tn and Tp are in the OFF state simultaneously, and represents a condition in which no charge is transferred into the segment in question (or out of that segment).

TABLE 7

| CHANGE IN DISPLAY STATE | MEMORY CIRCUIT | CONVERTER CIRCUIT | DENSITY CHANGE DETECTION CIRCUIT | | DRIVE CONDITIONS | | |
|---|---|---|---|---|---|---|---|
| | Sh' | Sh | Cwc | Cec | TN | TP | CHARGE AMOUNT |
| 10 CLEAR TO CLEAR | “0” | “0” | “0” | “1” | OFF | ON | Ie · $te_{11}$ |
| 11 CLEAR TO GREY | “0” | “1” | “1” | “0” | ON | OFF | Iw · $tw_{11}$ |
| 12 GREY TO CLEAR | “1” | “0” | “0” | “1” | OFF | ON | Ie · $te_{11}$ |
| 13 GREY TO GREY | “1” | “1” | “0” | “0” | OFF | OFF | OPEN-CIRCUIT |

Table 7 is a summary of the contents of Tables 3 and 5, and the results of logic equations (5) and (6).

The entry “open-circuit” represents a condition in which both of transistors Tn and Tp are simultaneously in the OFF state, so that no change occurs in the amount of charge stored in the corresponding segment. Signals Sh and Sh′ in Table 7 represent signals Sh to Sl and Sh′ to Sl′, respectively.

Operations performed on ECD cell segments 51*a* and 51*h* will now be described, referring to Table 6 and Table 7.

1. Clear state to clear state

The stabilized write current Ie is applied as pulse E11 for time t11, i.e. while pulse E11 is at the 1 logic level, to segment 51*a*. It is assumed that segment 51*a* was previously set in the clear state, so that even if some current acting to establish the clear state flows through the segment as a result of this operation, no change will occur in the clear display state of segment 51*a*.

2. Clear display state to grey display state

The stabilized write current Iw is applied to segment 51*a* while pulses W11 is at the 1 logic level, i.e. during pulse W11. As a result, an amount of charge Iw×tw11 becomes stored in segment 51*a*, and this segment therefore enters the grey display state.

3. Clear display state to dark display state

The stabilized write current Iw is supplied to segment 51*a* while pulse W11 is at the 1 level, i.e. during time tw11, and also while pulse W12 is at the 1 logic level, i.e. during time tw12. As a result, and amount of charge Iw×(tw11+tw12) becomes stored in segment 51*a*, so that this segment enters the dark display state.

4. Grey display state to clear display state

The stabilized write current Ie is supplied to segment 51 while pulse 11 is at the 1 level, i.e. during time te11. As a result, the charge previously stored in segment 51*a*, i.e. Iw×tw11, is completely discharged (since Iw×tw11 is less than stabilized write current Ie×te11), so that this segment enters the clear display state.

5. Grey display state to grey display state

Segment 51*a* is left in the open-circuit state. Accordingly, the charge of Iw×tw11 which was stored in this segment previously is left unchanged, so that the grey display state is maintained.

6. Grey display state to dark display state

The stabilized write current Iw is applied to segment 51*a* while pulse W1 is at the 1 logic level, i.e. during time tw12. As a result, the charge of Iw×tw11 which was previously stored in segment 51*a* is augmented by an amount of charge Iw×tw12, so that a charge of Iw×(tw11+tw12) becomes stored in sega, which therefore changes to the dark display state.

7. Dark display state to clear display state

The stabilized write current Ie is supplied to segment 51*a*, while pulse E11 is at the 1 logic level, i.e. during time te11. As a result, the charge amount Iw×(tw11+tw12) previously stored in segment 51*a* is completely discharged, since Iw×(tw11+tw12) is less than or equal to Ie×te11. Thus, segment 51*a* enters the clear display state.

8. Dark display state to grey display state

The stabilized write current Ie is supplied to segment 51*a* while pulse E12 is at the 1 logic level, i.e. during time te12. As a result, the charge amount Iw×(tw11+tw11), previously stored in segment 51*a*, is discharged by an amount Ie×te12, so that an amount of charge Iw×tw11 (since Iw×tw12=Ie×te12), becomes stored therein. Hence, segment 51*a* eners the grey display state.

9. Dark display state to dark display state

The charge of amount Iw11×(tw11+tw12), previously stored in segment 51*a* is left unchanged, so that the dark display state is maintained.

10. Clear display state to clear display state

The stabilized write current Ie is supplied to segment 51*h* while pulse E11 is at the 1 logic level, i.e. during time te11. Thus, since segment 51*h* was in the clear display state, even although an stabilized write current Ie flows through that segment, the clear display state is maintained.

11. Clear display state to grey display state

The stabilized write current Iw is supplied to segment 51*h* while pulse W11 is at the 1 logic level, i.e. during time tw11. An amount of charge Iw×tw11 is thereby stored in segment 51*h*, and so this segment enters the grey display state.

12. Grey display state to clear display state

The stabilized write current Ie is supplied to segment 51*h* while pulse E11 is at the 1 logic level, i.e. during time te11. As a result, the charge amount previously stored in segment 51*h*, i.e. Iw×tw11, is completely discharged (since Iw×tw11 is less than Ie×te11), so that segment 51*h* enters the clear display state.

13. Grey display state to grey display state

Segment 51*h* is left in the open-circuit state. Thus, the amount of charge previously stored in segment 51*h*, i.e. Ie×tw11, is left unchanged. The segment is therefore left in the grey display state.

Thus as can be understood from the above, as compared with a prior art type of ECD cell drive system which utilizes only two display states, i.e. the dark state and the clear display state, the first embodiment of the present invention comprises an ECD cell drive system in which an amount of electrical charge applied to a display segment e.g. segment 51*a* of ECD cell 51, and an amount of electrical discharge from segment 51*a*, are controlled by applying predetermined constant current values during fixed time intervals. As a result, a suitable amount of charge for providing state variations of segment 51*h*, i.e. to the clear display state, to the grey display state or to the dark display state, or amount of discharge, are controlled on time-determined basis. As a result, a highly practical dark-and-grey display state display can be provided. It should be noted that for correct operation of this embodiment, the values of stabilized write current Ie and of the stabilized write current Iw should be identical current values, and pulses W12 and E12 are identical in pulse width.

Figure 5:
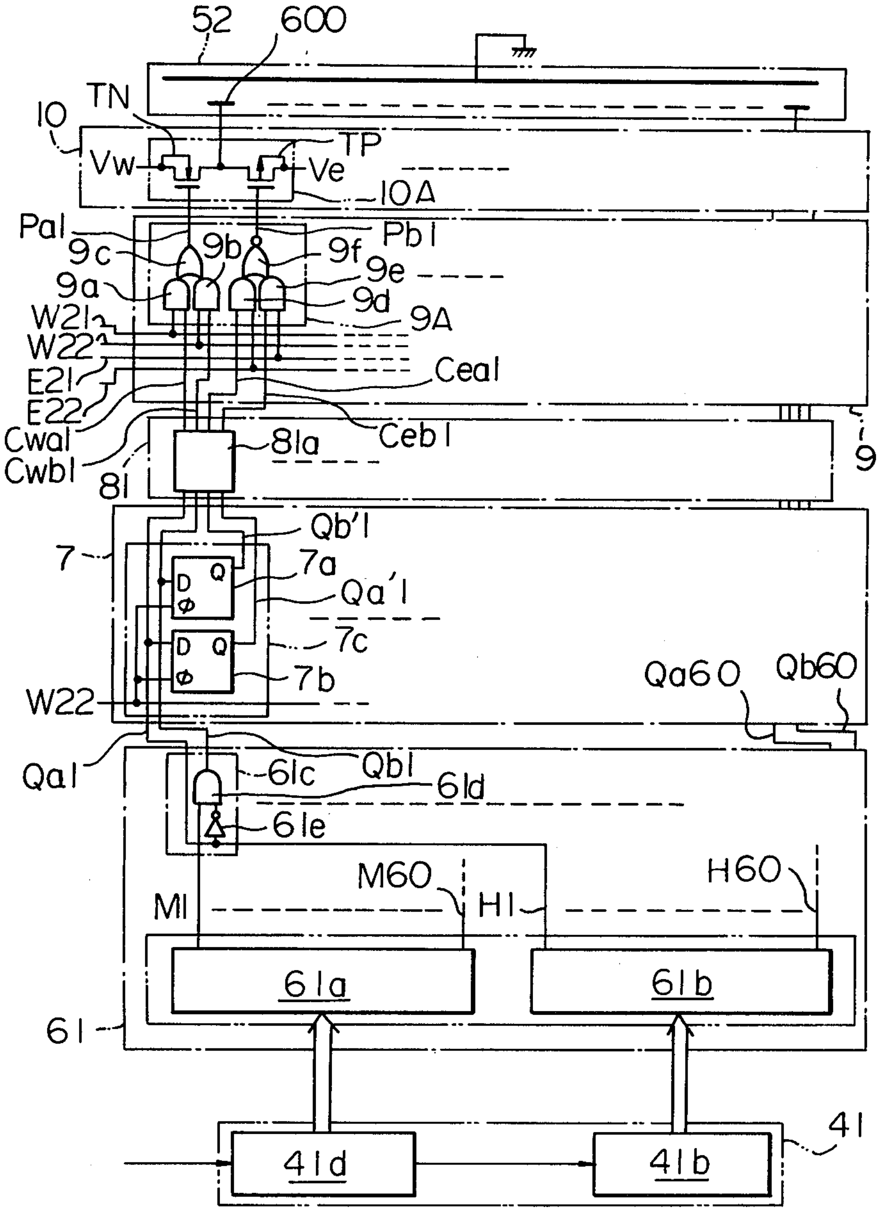
FIG. 5 is partial circuit diagram of a second embodiment of a drive system for an ECD cell according to the present invention.
Figure 7:
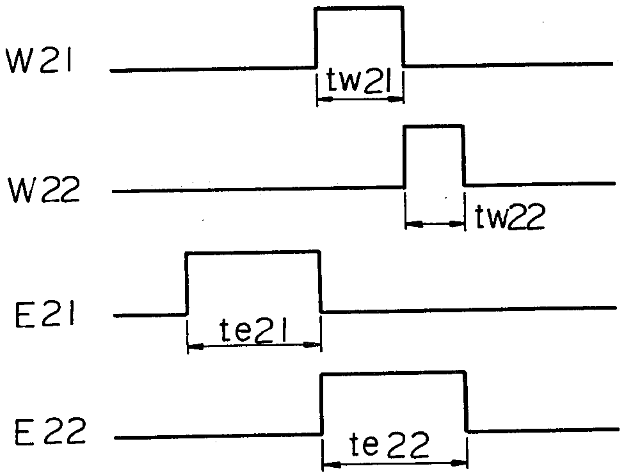
FIG. 7 is a timing chart for assistance in describing the operation of FIG. 5.

FIG. 5 is a circuit diagram showing the essential elements of a second embodiment of the present invention. This is a concrete realization of the system shown in FIG. 1. FIG. 7 is a timing chart for illustrating the operation of this second embodiment. In this embodiment, display segments are arranged such as to represent the hands of a timepiece. The segments form part of an ECD cell 52, and comprise an outer set of 60 segments arrayed around the periphery of ECD cell 52, i.e. segments 500, 501, . . . , and a set of 60 needle-shaped segments 600, 601, . . . , which are arrayed in a circle within the inner periphery of the ring of external segments 500, 501, . . . . The hours hand is indicated by one of the inner segments 600, 601, . . . being set in the dark display state, while the minutes hand is represented by one of the inner segments 600, 601, . . . being set in the grey display state while one of the outer segments 500, 501, . . . lying along the same radius as the latter inner segment is also set simultaneously in the grey display state. In order to increase understanding of the display, if the two segments out of the inner segments 600, 601, . . . which currently represent the minutes hand should overlap, (i.e. comprise the same segment), then that segment is set into the dark display state, so that the hours hand is clearly indicated.

FIG. 5 is a circuit diagram of the circuits used to drive the inner segments 600, 601, . . . , which serve both minutes and hours hand display functions. It should be noted that in this second embodiment, the power source 11 comprises a voltage stabilizer circuit, which produces a write-in stabilized voltage and an erase stabilized voltage. In FIG. 5, numeral 41 denotes a timekeeping counter, which comprises a minutes timekeeping counter 41*a* which receives as input the 1-second period signal from timekeeping circuit 2, and an hours timekeeping counter 41*b* which receives a 1-hour period signal from minutes timekeeping counter 41*a*. Numeral 61*a* denotes a converter circuit, comprising decoders 61*a* and 61*b*. Decoder 61*a* receives the contents of minutes timekeeping counter 41*a*, and produces output signals M1 to M60, which cyclically and sequentially go to the 1 logic level with a period of one minute. Decoder 61*b* receives the contents of hours timekeeping counter 41*b*, and produces output signals H1 to H60, which sequentially go to the 1 logic level with a period of 12 minutes. The converter circuit 61 further comprises a number of circuit sections such as 61*c*, each made up of the elements shown for sec 61*c*, i.e. an AND gate 61*c* and inverter 61*e*. Such a a converter circuit circuit sec 61*c* performs the following logic operations:

$$qa1 = H1,\ qb1 = M1 \times H1$$

$$qa2 = H2,\ qb2 = M2 \times H2$$

$$qa60 = H60,\ qb60 = M60 \times H60$$

Figure 8:
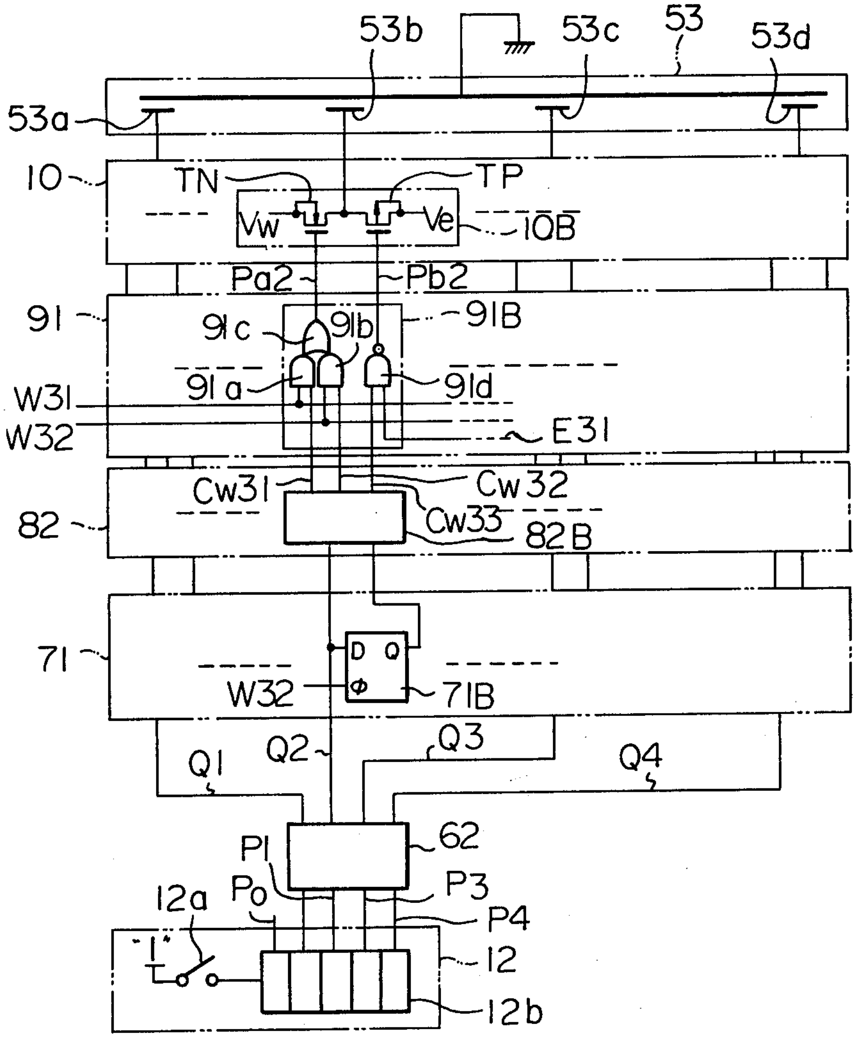
FIG. 8 is a partial circuit diagram of a third embodiment of a drive system for an ECD cell according to the present invention.

If the display data command signals Qa1, Qa2, . . . Qa60 (collectively designated as Qa) and the display data command signals Qb1, . . . Qb60 (collectively designated as Qb) are output from converter circuit sections 61*c*, then as shown in FIG. 8, the combinations of logic levels taken by the display data command signals Qa and Qb serve to designate the respective display density states of the display segments, which are here collectively designated by numeral 600. The relationships between the display data command signals and the resultant display states designated thereby are shown in Table 8 below.

TABLE 8

| DISPLAY DENSITY COMMAND SIGNALS | | COMMAND |
|---|---|---|
| Qa | Qb | CONTENTS |
| "0" | "0" | CLEAR DISPLAY STATE |
| "1" | "0" | DARK DISPLAY STATE |
| "0" | "1" | GREY DISPLAY STATE |
| "1" | "1" | DARK DISPLAY STATE |

Numeral 7 denotes a memory which comprises a set of 60 memory circuit sections, each identical to memory circuit section 7C. This comprises data type flip-flops 7*a*, and 7*b*. The memory 7 memorizes the command signals Qa and Qb on the trailing edge of pulse W22, i.e. when that pulse goes to the 0 logic level, to thereby produce as outputs the memory signals Qa', Qb' (where Qa' represents a group of memory signals Qa1', . . . Qa60', and Qb' collectively represents a group of memory signals Qb1', . . . Qb60'). Memory circuit 7*c* serves to memorize the previous display state of the corresponding segment 600 of ECD cell 52. Numeral 81 denotes a density change detection circuit, which receives as inputs the memory signals Qa', Qb' from memory 7, and command signals Qa, Qb from converter circuit 61, and operates on these signals in accordance with the logic equations (7) to (10) given below, to thereby produce as outputs a group of control signals Cwb1 to Cwb60 (collectively designated as Cwb), control signals Cwa1 to Cwa60 (collectively designated as Cwa), control signals Ceb1 to Ceb60 (collectively designated as Cwa), and control signals Cea1 to Cea60 (collectively designated as Cea). The density change detection circuit 81 detects changes in the display density states of ECD segments 600, 601, . . . from the previous state, and sets control signals Cwa, Cwb, Cea and Ceb to the 1 logic level in accordance with these changes as shown in Table 9.

$$Cwa=(Qa+Qb)\times Qa'\times Qb'+Qa\times Qb\times Qa' \quad (7)$$

$$Cwb=Qa\times Qa' \quad (8)$$

$$Cea=Qa\times Qb\times Qa' \quad (9)$$

$$Ceb=Qa\times Qb \quad (10).$$

TABLE 9

| Control signals | Previous display density state | Newly designated display state |
|---|---|---|
| Cwa = 1 level | clear state | grey or dark state |
| Cwb = 1 level | dark state | grey state |
| | clear or grey state | dark state |
| Cea = 1 level | dark state | grey state |
| Ceb = 1 level | clear or grey or dark state | clear state |

Figure 11:
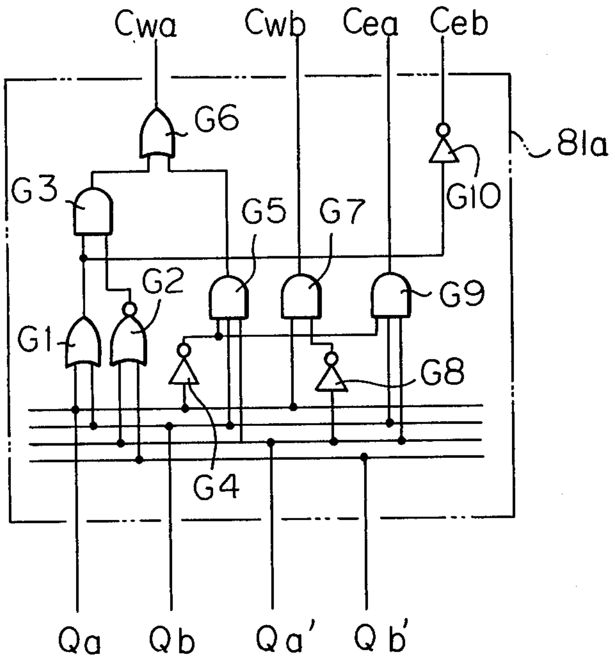
FIG. 11 is a circuit diagram of a modification to the circuit of FIG. 8.

The density change detection circuit 81 comprises 60 circuit sections, each identical to density change detection circuit section 81A. As shown in FIG. 11, each of these density change detection circuit sections comprises an OR gates G1 and G6, NOR gate G2, and AND gates G5, G7, G3 and G9, and inverters G4, G8 and G10. Numeral 9 denotes a selector circuit which receives as inputs the control signals Cwa, Cwb, Cea and Ceb from density change detection circuit section 81A and which selects clock pulses sent from first clock pulse generating circuit 3, that is the first write timing pulse W21 and the second write timing pulse W22, first erase timing pulse E21 and second erase timing pulse E22. The selector circuit 9 comprises 60 selector circuit sections each of which is identical in configuration to selector circuit section 9A.

The selector circuit section 9A comprises a first gate circuit made up of AND gates 9*a* and 9*b*, and OR gate 9*c*, and a second gate circuit made up of AND gates 9*d* and 9*e* and NOR gate 9*f*. Numeral 10 denotes a drive circuit, made up of 60 drive circuit sections each having an identical configuration to drive circuit 10A. This comprises an N-channel MOS transistor Tn and a P-channel MOS transistor Tp. The drive circuit 10 supplies a write stabilized voltage Vw to segment 600 when signal Pal from the first gate circuit in selector circuit 9*a* is at the 1 logic level, and supplies an erase stabilized voltage Ve to the segment when signal Pb1 from second gate circuit in selector circuit 9A is at the 0 logic level. Numeral 52 denotes the ECD cell shown in FIG. 6. The relationships between the pulses shown in FIG. 7. First, pulses E21 and E22 must not overlap. W21 and W22 must not overlap. After the write stabilized voltage Vw is applied to a segment 600 which is in the clear display state, during time (tw21+tw22), then that segment will be converted to the dark state. If the erase stabilized voltage Ve is then applied for time te21 or te22, then then the segment will return to the clear state. Here, tw21, tw22, te21 and te22 denote the times for which each pulse W21, W22, E21, E22 is at the 1 logic level.

Figure 6:
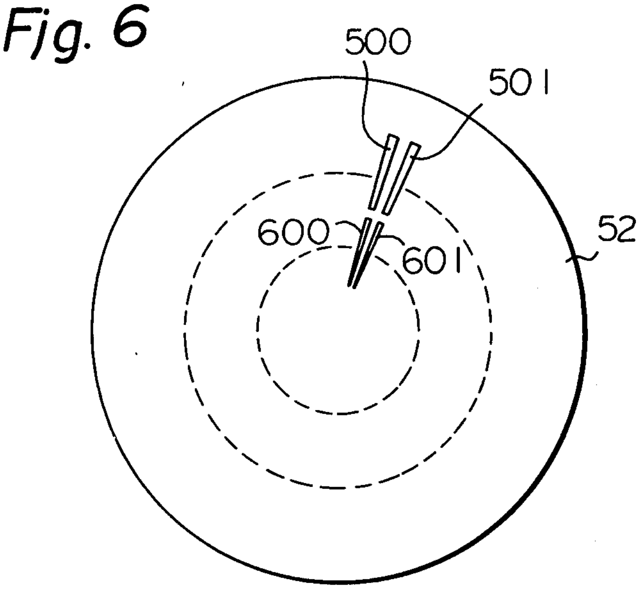
FIG. 6 is a plan view of an ECD cell used in the second embodiment.

The operation will now be described, referring to FIG. 5 and FIG. 6. The contents of timekeeping circuit 41 are output to converter circuit 61, and transferred out in the form of command signals Qa and Qb, which designate the display states of s segments 600. Memory circuit 7 memorizes signals Qa and Qb from converter circuit 61, on the falling edge of a W22 pulse, and produces memory signals Qa', Qb'. The density change detection circuit 81 and drive circuit 9 then operate in synchronism with pulses E21, E22, W21 and W22, to thereby drive segments 600.

Table 10 is a summary of the above, and of the results of applying logic equations (7) to (10) to the contents of Table 9. The entries containing a broken line indicate that any of the logic levels shown is permissible.

TABLE 10

| DISPLAY STATE CHANGE | MEMORY CIRCUIT Qa' | MEMORY CIRCUIT Qb' | CONVERTER CIRCUIT Qa | CONVERTER CIRCUIT Qb | DENSITY STATE CONVERTER CIRCUIT Cwa | Cwb | Cea | Ceb | DRIVE CONDITIONS TN | TP | CHARGE AMOUNT |
|---|---|---|---|---|---|---|---|---|---|---|---|
| CLEAR TO CLEAR | "0" | "0" | "0" | "0" | "0" | "0" | "0" | "1" | OFF | ON | $Ve \times te_{22}$ |
| CLEAR TO GREY | "0" | "0" | "0" | "1" | "1" | "0" | "0" | "0" | ON | OFF | $Vw \times tw_{21}$ |
| CLEAR TO DARK | "0" | "0" | "1" | "0" "1" | "1" | "1" | "0" | "0" | ON | OFF | $Vw \times (tw_{21} + tw_{22})$ |
| GREY TO CLEAR | "0" | "1" | "0" | "0" | "0" | "0" | "0" | "1" | OFF | ON | $Ve \times te_{22}$ |
| GREY TO GREY | "0" | "1" | "0" | "1" | "0" | "0" | "0" | "0" | OFF | OFF | OPEN-CIRCUIT STATE |
| GREY TO DARK | "0" | "1" | "1" | "0" "1" | "0" | "1" | "0" | "0" | ON | OFF | $Vw \times tw_{22}$ |
| DARK TO CLEAR | "1" | "0" "1" | "0" | "0" | "0" | "0" | "0" | "1" | OFF | ON | $Ve \times te_{22}$ |
| DARK TO GREY | "1" | "0" "1" | "0" | "1" | "1" | "0" | "1" | "0" | OFF ↓ ON | ON ↓ OFF | $Ve \times te_{21}$ ↓ $Vw \times tw_{21}$ |
| DARK TO DARK | "1" | "0" "1" | "1" | "0" "1" | "0" | "0" | "0" | "0" | OFF | OFF | OPEN-CIRCUIT STATE |

The drive operations performed on segments 600 will now be described, based on Table 10.

1. Clear to clear state

The stabilized erase voltage Ve is applied to a segment while pulse E22 is at the 1 level, i.e. during time te22. No change from the clear state of the segment takes place, even if some current flow occurs therein.

2. Clear to grey state

The write stabilized voltage Vw is supplied to a segment while pulse W21 is at the 1 level, i.e. during time tw21. The segment enters the grey display state.

3. Clear state to dark state

The write stabilized voltage Vw is applied to the segment while pulse W21 is at the 1 level, and also while pulse W22 is at the 1 level, i.e. during time tw21 and tw22. The segment is thereby set iun the dark display state.

4. Grey state to clear state.

The stabilized erase voltage Ve is applied while pulse E22 is at the 1 level, thereby setting the segment in the clear display state.

5. Grey state to grey state

The segment is left in the open-circuit condition, so that the grey state is left unchanged.

6. Grey state to dark state

The write stabilized voltage Vw is applied to the segment while pulse W22 is at the 1 level. The segment is therefore changed from the grey display state to the dark display state.

7. Dark state to clear state

The stabilized erase voltage Ve is applied to the segment while pulse E22 is at the 1 level, so that the segment is set in the clear display state.

8. Dark state to grey state

Initially, the stabilized erase voltage Ve is applied to the segment while pulse E21 is at the 1 level, during time te21, so that the segment is set in the clear display state. Next, the write stabilized voltage Vw is applied while pulse W21 is at the 1 level, i.e. for time tw21. As a result, the segment is set in the grey display state.

9. Dark state to dark state

The segment is left in the open-circuit condition, so that the dark display state is maintained.

It will be noted that in the case of the display state of entry 8 in Table 9 above, i.e. dark display state to grey display state, the transition is performed from the dark to the clear display state, and then from the clear to the grey display state. This serves to ensure that the same grey state display density is attained by the display segment undergoing such a transition, as the display density which is attained when a transition from the clear to the grey display state occurs (i.e. that of entry 4 in table 9. If a transition were performed directly from the dark to the grey display state, then it is probable that the resultant grey display state density would be different from that resulting from a transition from the clear to the grey display state. This would affect the display quality, as stated hereinabove. This problem arises from the difficulty of accurately controlling the rate of discharge from the segments in response to application of the stabilized erase voltage Ve during a fixed interval, and the fact that the rate of change from the clear state toward the dark display state in response to application of a fixed voltage will in general be different from the rate of change from the dark state to the clear state, in response to the same value of voltage. This has been confirmed by experiment, but the problem is overcome by the two-stage transition from the dark to the grey display state, which ensures that a uniform grey display state is always attained. This feature of the second embodiment is a basic factor in ensuring that such an ECD drive system is practical and useful.

In this second embodiment, some changes are incorporated in the method of indicating the hours and minutes hands. When the hours and minutes hands are being displayed independently, i.e. by independent segments, then the respective segments are shown in the grey display state. When the hands overlap, then the corresponding segments are set in the dark display state. The modifications to achieve this will now be described. Firstly, selector circuit 61 of FIG. 5 can be replaced by a selector circuit which produces combinations of display density command signals Qa and Qb such that segments 600 of the ECD cell 52 attain the display states shown in Table 4, with signals Qa and Qb satisfying the logic equations (11) and (12) given below. To this end, the modified selector circuit is provided with a first gate group comprising a plurality of AND gates and a second gate group comprising a plurality of exclusive-OR gates.

$$Qa = Mx \times H + M \times H \quad (11)$$

$$Qb = M \times H \qquad (12)$$

Furthermore, the density change detection circuit 81 in FIG. 5 can be replaced by a density change detection circuit which produces control signals Cwa', Cwb', Cea', Ceb', that satisfy the conditions of logic equations (13) and (16) below. Table 11 shows the conditions under which these control signals respectively attain the 1 logic level.

$$Cwa' = (Qa + Qa' \times Qb' + (Qa \times Qb) + (Qa \times Qb) - \times Qa' \times Qb' \qquad (13)$$

$$Cwb' = Qa \times Qb \times (Qa' \times Qb') \qquad (14)$$

$$Cea' = (Qa \times Qb) + (Qa \times Qb) \times Qa' \times Qb' \qquad (15)$$

$$Ceb' = Qa \times Qb \qquad (16)$$

The operation of the second embodiment modified as described above is illustrated in Table 11 in abbreviated form.

Thus, by performing minor modifications to the second embodiment shown in FIG. 5, a useful and practical ECD drive system can be implemented.

display state, and when a function is selected (i.e. made operational), the corresponding segment is set in the dark display state. The segment **53*b* in FIG. 9 corresponding to segment 53*b* in FIG. 8. In FIG. 10, only segment 53*b*** is shown in the dark display state, indicating that only the second alarm function is currently selected.

In FIG. 8, numeral 12 denotes a display data circuit, comprising a function selector circuit. This sequentially selects the 4 functions described above. On successive actuations of function selector switch **12*a*, function selection signals P0 to P4 successively go to 1 logic level, being output from a ring counter circuit 12*b* comprising 5 flip-flop stages in function selection circuit 12**, as shown in Table 12.

Numeral 62 denotes a converter circuit, which receives signals P0 to P4 from function selection circuit 12, as shown in Table 12, and produces display density command signals Q (collective designation for signals Q1, Q2, Q3 and Q4). As shown in Table 13, the display density command signals Q designate the respective display states entered by segments **53*a* to 53*d* of ECD cell 53**.

TABLE 12

| No. OF SWITCH ACTUATIONS | FUNCTION SELECTOR CIRCUIT P0 | P1 | P2 | P3 | P4 | FUNCTION SELECTED | CONVERTER CIRCUIT Q1 | Q2 | Q3 | Q4 |
|---|---|---|---|---|---|---|---|---|---|---|
| 0 | "1" | "0" | "0" | "0" | "0" | NO FUNCTION SELECTED | "0" | "0" | "0" | "0" |
| 1 | "0" | "1" | "0" | "0" | "0" | FIRST ALARM FUNCTION | "1" | "0" | "0" | "0" |
| 2 | "0" | "0" | "1" | "0" | "0" | SECOND ALARM FUNCTION | "0" | "1" | "0" | "0" |
| 3 | "0" | "0" | "0" | "1" | "0" | ELAPSED TIME FUNCTION | "0" | "0" | "1" | "0" |
| 4 | "0" | "0" | "0" | "0" | "1" | STOPWATCH FUNCTION | "0" | "0" | "0" | "1" |

TABLE 11

| | DISPLAY STATE CHANGE | MEMORY CIRCUIT Qa' | Qb' | CONVERTER CIRCUIT Qa | Qb | DENSITY CHANGE DETECTION CIRCUIT Cwa' | Cwb' | Cea' | Ceb' | DRIVE CONDITIONS CHANGE AMOUNT | | |
|---|---|---|---|---|---|---|---|---|---|---|---|---|
| 1 | CLEAR STATE TO CLEAR STATE | "0" | "0" | "0" | "0" | "0" | "0" | "0" | "1" | OFF | ON | Ve × $te_{22}$ |
| 2 | CLEAR STATE TO GREY STATE | "0" | "0" | "0"<br>"1" | "1"<br>"0" | "1" | "0" | "0" | "0" | ON | OFF | Vw × $tw_{21}$ |
| 3 | CLEAR STATE TO DARK STATE | "0" | "0" | "1" | "1" | "1" | "1" | "0" | "0" | ON | OFF | Vw × ($tw_{21}$ + $tw_{22}$) |
| 4 | GREY STATE TO DARK STATE | "0"<br>"1" | "1"<br>"0" | "0" | "0" | "0" | "0" | "0" | "1" | OFF | ON | Ve × $te_{22}$ |
| 5 | GREY STATE TO GREY STATE | "0"<br>"1" | "1"<br>"0" | "0"<br>"1" | "1"<br>"0" | "0" | "0" | "0" | "0" | OFF | OFF | OPEN-CIRCUIT STATE |
| 6 | GREY STATE TO DARK STATE | "0"<br>"1" | "1"<br>"0" | "1" | "1" | "0" | "1" | "0" | "0" | ON | OFF | Vw × $tw_{22}$ |
| 7 | DARK STATE TO CLEAR STATE | "1" | "1" | "0" | "0" | "0" | "0" | "0" | "1" | OFF | ON | Ve × $te_{22}$ |
| 8 | DARK STATE TO GREY STATE | "1" | "1" | "0"<br>"1" | "1"<br>"0" | "1" | "0" | "1" | "0" | OFF<br>↓<br>ON | ON<br>↓<br>OFF | Ve × $te_{21}$<br>↓<br>Vw × $tw_{21}$ |
| 9 | DARK STATE TO DARK STATE | "1" | "1" | "1" | "1" | "0" | "0" | "0" | "0" | OFF | OFF | OPEN-CIRCUIT STATE |

Figure 9:
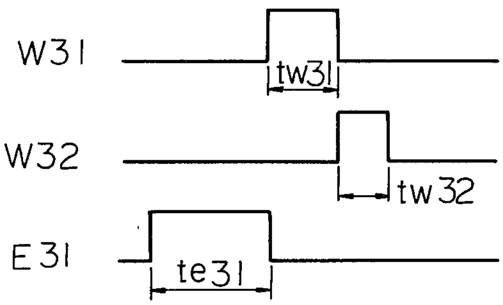
FIG. 9 is a timing chart for assistance in describing the operation of FIG. 8.
Figure 10:
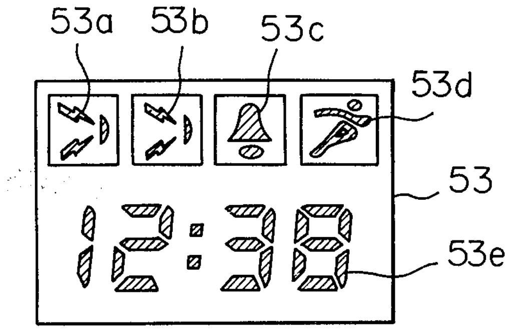
FIG. 10 is a plan view of an ECD cell used in the third embodiment.

FIG. 8 illustrates the basic elements of a third embodiment and FIG. 9 is a corresponding timing diagram. The overall configuration is that of FIG. 1. This embodiment provides indication of special functions using an ECD cell, which is shown in FIG. 10. The ECD cell is provided with a plurality of segments **53*e* for indicating time data, and also a set of segments 53*a* to 53*d* for displaying special functions. Segment 53*a* provides a first alarm function indication, segment 53*b* a second alarm function, segment 53*c* an elapsed timg indication function, and segment 53*d*** a stopwatch function. When these functions are in the non-selected state, then the corresponding segments are set in the grey

TABLE 13

| DISPLAY DENSITY COMMAND SIGNALS Q | DISPLAY CONTENTS |
|---|---|
| "0" | GREY DISPLAY STATE |
| "1" | DARK DISPLAY STATE |

Numeral 71 denotes a memory circuit for memorizing the display density command signals Q from converter circuit 62 on the trailing edge of pulse W32 and for thereby producing corresponding memory signals Q' as outputs. Memory circuit 71 comprises 4 circuit sections, each identical to section 71B, which comprises one data-type flip-flop. This memory circuit section 71B memorizes the previous display state of segment 53*b*. Numeral 82 denotes a density change detection circuit, which receives the memory signals Q', and produces control signals Cw31, Cw32 and Ce31 as outputs, in accordance with equations (17) to (19) below. The density change detection circuit 82 comprises 4 circuit sections, each identical to density change detection circuit section 82B.

$$Cw31 = Q \times Q' \quad (17)$$

$$Cw32 = Q \times Q' \quad (18)$$

$$Cw33 = Q \times Q' \quad (19)$$

Numeral 91B denotes a selector circuit section comprising a first gate circuit made up of AND gates 91*a*, 91*b* and OR gate 91*c*, which receives control signals Cw31 and Cw32 from density change detection circuit 82 and acts to select a first write timing pulse W31 from clock pulse generating circuit 3 shown in FIG. 1, and a second circuit made up of AND gate 91*d*. The latter circuit receives control signals Cw33 and selects the erase timing pulse E31 sent from clock pulse generating circuit 3. Selector circuit 91 comprises 4 circuit sections, each identical to section 91*b*. A drive circuit 10 comprises four drive circuit sections, each identical to section 10*b* in configuration. The drive circuit section 10B comprises an N-channel MOS transistor Tn which receives signal Pa2 the first gate circuit in selector circuit 91 and supplies the write stabilized voltage Vw from power source 11 shown in FIG. 1 to segment 53*b* of ECD cell 53, and a P-channel MOS transistor Tp which receives signal Pb2 from the second gate circuit in selector circuit 91 and supplies the stabilized erase voltage Ve to segment 53*b*.

Numeral 53 denotes the ECD cell shown in FIG. 10.

The following relationships exist between the pulses W31, W32, E31 shown in FIG. 9. Firstly, these pulses must not mutually overlap. When the write stabilized voltage Vw is applied to segment 53*b* which is in the clear display state, during time (tw31+tw32), and segment 53*b* is thereby set in the dark display state, then if the stabilized erase voltage Ve is applied to that segment for time te31, segment 53*b* is set in the clear display state. These times tw31, tw32 and te31 denote the times for which pulses W31, W32 and E31 respectively are at the 1 logic level respectively.

Table 14 below shows the conditions under which output signals Cw31, Cw32 and Ce31 are output from density change detection circuit 82 at the 1 logic level.

TABLE 14

| CONTROL SIGNAL | PREVIOUS DISPLAY DENSITY STATE | NEWLY DESIGNATED DISPLAY DENSITY STATE |
|---|---|---|
| $C_{w31}$ = "1" | DARK STATE | GREY STATE |
| $C_{w32}$ = "1" | GREY STATE | DARK STATE |
| $C_{e31}$ = "1" | CLEAR STATE | GREY STATE |

The operation of the second embodiment will now be described, referring to FIG. 8 and FIG. 9. In response to actuations of switch 12*a*, as shown in Table 12, the function selector circuit 12 enters a specific function selection state. For example, if the second alarm function is selected, then converter circuit 62 outputs command signals Q2 at the 1 logic level, and this is memorized in memory circuit 71B on the falling edge of pulse W32, to thereby produce memory signal Q2'. Thereafter, density change detection circuit 82B, selector circuit section 91B, and drive circuit section 10B operate to drive section 53B in synchronism with pulses W31, W32 and E31 from clock pulse generating circuit 3.

TABLE 15

| DISPLAY STATE CHANGE | MEMORY CIRCUIT $Q_1'$ | CONVERTER CIRCUIT $Q_1$ | DENSITY CHANGE DETECTION CIRCUIT $C_{w31}$ | $C_{w32}$ | $C_{e31}$ | DRIVE CONDITIONS TN | TP | CHANGE AMOUNT |
|---|---|---|---|---|---|---|---|---|
| 1 CLEAR STATE TO CLEAR STATE | — | — | "0" | "0" | "0" | OFF | OFF | OPEN CIRCUIT |
| 2 CLEAR STATE TO GREY STATE | — | "0" | "0" | "0" | "0" | OFF | OFF | OPEN CIRCUIT |
| 3 CLEAR STATE TO DARK STATE | — | "1" | "0" | "0" | "0" | OFF | OFF | OPEN CIRCUIT |
| 4 GREY STATE TO CLEAR STATE | 0 | — | "0" | "0" | "0" | OFF | OFF | OPEN CIRCUIT |
| 5 GREY STATE TO GREY STATE | "0" | "0" | "0" | "0" | "0" | OFF | OFF | OPEN-CIRCUIT |
| 6 GREY STATE TO DARK STATE | "0" | "1" | "0" | "1" | "0" | ON | OFF | $Vw \times tw_{32}$ |
| 7 DARK STATE TO CLEAR STATE | "1" | — | "0" | "0" | "0" | OFF | OFF | OPEN CIRCUIT |
| 8 DARK STATE TO GREY STATE | "1" | "0" | "1" | "0" | "1" | OFF ↓ | ON ↓ $Vw \times tw_{31}$ | $Ve \times te_{31}$ ↓ |
| 9 DARK STATE TO DARK STATE | "1" | "1" | "0" | "0" | "0" | OFF | OFF | OPEN-CIRCUIT |

Table 15 above summarizes the contents of Tables 12, 13 and 14 above, and the results of equations (17) and (19). It should be noted that the state changes 1, 2, 3, 4 and 7 in Table 15 will not normally occur, since segment 53*b* will not normally enter the clear display state.

The drive operations performed on segment 53*b* will now be described, based on Table 15.

5. Grey state to Grey state

Segment 53*b* is left in the open-circuit state, so that the grey display state is maintained.

6. Grey state to Dark state

The write stabilized voltage Vw is applied to display segment 53*b* while pulse W22 is at the 1 level, i.e. during time tw22. Since the segment was previously in the grey display state, it is changed to the dark display state.

8. Dark state to Grey state

First, the stabilized erase voltage Ve is applied to segment 53*b* while pulse E31 is at the 1 level, i.e. for time te31, and as a result the segment is set in the clear display state. Next, the write stabilized voltage Vw is applied to the segment for time tw31, when pulse W31 is at the 1 level. As a result, the segment enters the grey display state.

9. Dark state to Dark state

Segment 53*b* is left in the open-circuit state, so that no change in the dark display state occurs.

From the above descriptions of the preferred embodiments, it can be understood that the present invention employs a feature of electrochromic display cells, namely a capability for being set into each of a plurality of different display density states which are stably maintained, and that the present invention discloses practical and simple means whereby this feature may be utilized to provide a variety of new display functions using electrochromic display cells. It should be noted that although the invention has been described for the case of only two display density states (i.e. the grey state and the dark state), it will be apparent that the invention can equally be employed to provide drive systems for providing a larger number of different display density states, so that a number of different graphic display "shades" may be produced.

It should also be noted that various other changes and modifications to the described embodiments may be envisaged, which fall within the scope claimed for the present invention, so that the above description is to be interpreted in a descriptive and not in a limiting sense.

What is claimed is:

1. A drive system for an electrochromic display cell having a plurality of display segments, comprising:

display data circuit means for producing display data signals corresponding to data to be displayed by at least one of said display segments;

timing signal generating circuit means for producing a plurality of timing pulse signals including write timing pulse signals and erase timing pulse signals;

converter circuit means coupled to receive said display data signals and responsive thereto for producing display data command signals to selectively designate a plurality of display density states of said display segment comprising at least a dark display density state and at least one grey display density state which is lower in density than said dark display density state;

memory circuit means for memorizing said display data command signals from said converter circuit means and for producing corresponding memory signals;

density change detection circuit means coupled to receive said memory signals from said memory circuit means and said display data command signals from said converter circuit means and responsive thereto for detecting changes in the display density state designated for said display segment by said display data command signals and for producing control signals in accordance with the results of said detection of changes;

selector circuit means controlled by said control signals from said density change detection circuit means for selectively transferring specific pulses of said write timing pulse signals and said erase timing pulse signals to be output therefrom;

a power source;

drive circuit means controlled by said write timing pulse and erase timing pulse signals output from said selector circuit means for selectively supplying specific quantities of charge from said power source to said display segment and discharging said display segment by specific quantities of charge, to thereby selectively set said display segment into one of said plurality of display density states as designated by said display data command signals in accordance with said display data signals.

2. A drive system according to claim 1, in which said display data command signals from said converter circuit means selectively designate a clear display state, a grey display density state and a dark display density state of said display segment, and in which said memory circuit means comprise a first memory circuit comprising a bistable circuit for memorizing display data command signals which designate a dark display density state, and a second memory circuit comprising bistable circuits for selectively memorizing display data command signals designating said grey display density state and said clear display state.

3. A drive system according to claim 1, in which said memory circuit means comprise a bistable circuit for memorizing display data command signals selectively designating said grey display density state and said dark display density state produced by said converter circuit means.

4. A drive system according to claim 1, in which, in order to change said display segment from said dark display density state to said grey display density state in accordance with said display data signals, said selector circuit means is operative to first produce one of said display data command signals designating a clear display state and then one of said display data command signals which designates said grey display density state, whereby said display segment is momentarily set into said clear display state in the course of changing from said dark to said grey display density state.

5. A drive system according to claim 1, in which said display data circuit means comprise a timekeeping circuit coupled to receive timing signals from said timing signal generating circuit means for thereby computing time information and producing output signals indicative thereof as said display data signals, said timekeeping circuit comprising at least a minutes counter circuit and hours counter circuit for counting minutes and hours time information.

6. A drive system according to claim 5, in which said display data circuit comprises a plurality of timekeeping counter circuits, and in which said converter circuit means comprise a first group of gate circuits responsive to predetermined combinations of logic levels of timekeeping signals from said timekeeping counter circuits for producing display data command signals designating said dark display density state, and a second group of gate circuits responsive to predetermined combinations of logic levels of timekeeping signals from said timekeeping counter circuits for producing display data command signals selectively designating said clear display state and grey display density state.

7. A drive system according to claim 6, in which said timekeeping counter circuits comprise a seconds timekeeping counter circuit and a days timekeeping counter circuit, and in which said first gate circuit group comprises a group of AND gates and said second gate circuit group comprise a group of exclusive-OR gates, said first and second gate circuit groups being coupled to receive seconds and days timekeeping signals from said seconds and days timekeeping counter circuits.

8. A drive system according to claim 4, in which said timekeeping counter circuits comprise a minutes timekeeping counter circuit and an hours timekeeping counter circuit, and in which said first gate circuit group comprises a group of AND gates and said second gate circuit group comprise a group of exclusive-OR gates, said first and second gate circuit groups being coupled to receive minutes and hours timekeeping signals from said minutes timekeeping counter circuit and hours timekeeping counter circuit.

9. A drive system according to claim 1, in which said power source comprises a stabilized write voltage source, coupled to said display segments under the control of said write timing pulse segments from said selector circuit means and a stabilized erase voltage source, coupled to said display segments under the control of said erase timing pulse signals from said selector circuit means.

10. A drive system according to claim 1, in which said power source comprise a stabilized write current source, which is coupled to said display segments under the control of said write timing pulse signals from said selector circuit means and a stabilized erase current source, which is coupled to said display segments under the control of said erase timing pulse signals from said selector circuit means.

* * * * *